United States Patent [19]

Peeling, Jr.

[11] 3,867,157

[45] Feb. 18, 1975

[54] PROCESS AND COMPOSITIONS FOR PORCELAIN ENAMELING

[75] Inventor: John E. Peeling, Jr., Reisterstown, Md.

[73] Assignee: SCM Corporation, Cleveland, Ohio

[22] Filed: Apr. 17, 1972

[21] Appl. No.: 244,901

[52] U.S. Cl............ 106/48, 106/49, 106/54, 106/300, 117/100, 117/129
[51] Int. Cl............................................ C03c 5/02
[58] Field of Search............ 117/100, 135.1, 169 R, 117/124 T, 70 R, 70 A, 70 B, 70 C, 70 D, 40, 42; 65/33, 106/48, 52, 45, 300, 312, 54, 49

[56] References Cited

UNITED STATES PATENTS

| | | | |
|---|---|---|---|
| 1,785,777 | 12/1930 | Kinzie | 106/48 |
| 1,988,800 | 1/1935 | Kinzie | 106/48 |
| 2,057,958 | 10/1936 | Kinzie | 106/48 |
| 2,332,424 | 9/1939 | Zwermann | 106/48 |
| 2,776,899 | 1/1957 | Donahey | 106/45 |
| 3,017,279 | 1/1962 | Van Kolah et al. | 106/48 |
| 3,244,639 | 4/1966 | Mindick et al. | 106/48 UX |
| 3,404,027 | 10/1968 | Kosiorek | 117/125 |

FOREIGN PATENTS OR APPLICATIONS 1,007,296 10/1965 Great Britain................ 106/48

OTHER PUBLICATIONS

Shannon, Titanium Opacified Porcelain Enamels, 1960, University of Illinois, Bull. 456, p. 40, 48.
Schroeder, H., Physics of Thin Films, Academic Press (1969), Edited by Hass & Thun, Vol. 5, pp. 87–90, 95–96, 105–109, and 120, 138–141.

Primary Examiner—Helen M. McCarthy
Attorney, Agent, or Firm—Merton H. Douthitt

[57] ABSTRACT

Disclosed are methods and compositions for stabilizing titania-opacified porcelain enameling frits against the yellow "color shift" upon firing, by applying to the frit particles prior to firing a titanium compound which when heated to a temperature lower than fusion temperature of the frit particles will form a hydrous titania layer in the amount sufficient for enhancing the formation of the anatase polymorph of titania in the resulting porcelain enameling coating.

4 Claims, No Drawings

PROCESS AND COMPOSITIONS FOR PORCELAIN ENAMELING

This invention relates to the protective and decorative coating of metal and metal alloy substrates and more particularly to a method of promoting color stability in titania-opacified porcelain enamels.

It is common practice to apply titania-opacified ceramic coatings to a wide variety of heat resistant substrates. These coatings are formed by applying a $TiO_2$-containing ceramic frit to the substrate and then firing at a temperature and for a time sufficient to fuse the frit and form a continuous vitreous ceramic coating which contains a crystalline polymorph (i.e., anatase and/or rutile) of $TiO_2$ as the opacifying species. When the substrate is metal or a metal alloy, such as steel, copper, bronze, stainless steel, aluminum or silver, the process is known as porcelain enameling. In most common practice, the metal substrate is a low carbon steel known as enameling steel.

Titanium oxide has been widely used as an opacifier in porcelain enamels for both the so-called wet and dry process applications to metal sheet stock. In the wet process the titania-opacified porcelain enameling frit is applied in slurry or slip form to the substrate. In the dry process enameling, the titania-opacified frit is applied directly to a heated substrate such as shown in U.S. Pat. No. 3,409,458, the disclosure of which is incorporated by reference. In either the wet or dry process the firing of porcelain enamel frits on a metal substrate at temperatures of about 1,400° to 1,700°F., causes the frit to fuse and titanium dioxide to crystallize. The desired crystalline polymorph is the anatase polymorph which is a bluish-white opacifier. Unfortunately, titania often crystallizes in both the anatase and rutile form. The rutile form has poor color stability and tends to assume a yellowish color during firing which is generally considered to be unsatisfactory when any color other than yellow is intended.

This yellowish color is known in the ceramic art as "yellow color shift." This yellow color shift has been observed in practically all colors and shades of titania-opacified porcelain enamels, such as green, white, pink, tan, and blue, although the detrimental effect on the color is particularly severe in the case of the white and blue shades. Since the thermodynamics of the rutile-anatase equilibrium favors the formation of rutile, prolonged firing results in the formation of rutile and the associated yellow color shift.

In the past, attempts have been made to compensate for the color shift by adding blue pigments to the coating because blue is the complement of yellow. This technique has merely masked the yellow rather than eliminated the underlying problems.

The mechanism by which enamels are formed is not clearly understood, although electron micrographs have shown that on firing porcelain enamels, viscous flow occurs at the surface of the coating and at other points (for example, in the locality of large bubbles) where there is sufficient force to overcome surface tension and viscosity of the glass. In the interior of the coating, the frit particles fuse together to form a coherent, continuous glassy mass; but significant flow does not occur due to the relatively high viscosity. Thus, the particles do not lose their individual identity, and particle boundaries are distinguishable by micrographic techniques.

By the same method, it has been shown that anatase crystallizes preferentially in the interior of the frit particles, while rutile crystallizes preferentially at the outer surface of the coating and at the particle boundaries. This phenomenon occurs at all normal firing temperatures. As firing temperature or time is increased, the rutile crystals grow at the expense of the anatase. The greater thermodynamic stability of rutile compared with anatase also favors rutile growth. Associated with this growth of rutile is a marked tendency for the color of the glaze or porcelain enamel to shift from "blue-white" to "yellow-white" as firing temperature or time is increased or firing is repeated.

A corollary of the preferential crystallization and growth of rutile at the frit particle interfaces is that the quantity of rutile formed on firing will increase with increasing surface area of the frit. In other words, the smaller the frit particle size, the greater will be the quantity of rutile formed. The practical effects of this have been noted in that finely ground porcelain enamel frits tend to be less color stable at increased firing times or temperatures than coarsely ground porcelain enamel frits.

The present invention provides for suppression of the formation of growth of rutile in porcelain enamel frits of all particle size and thereby suppresses the yellow color shift in the finished porcelain enamel coating.

It has now been discovered that the yellow color shift in titania-opacified porcelain enamels can be reduced by providing porcelain enameling frit particles containing an opacifying proportion of $TiO_2$ with a surface layer of hydrous titania in an amount sufficient for enhancing the formation of the anatase polymorph of titania in the resulting porcelain enamel coating. The frit particles can be provided with the hydrous titania layer anytime prior to thermally fusing the frit to form the porcelain enamel coating. For instance, formation of the hydrous titania layer can occur during the early part of the firing cycle by decomposition of a titanium compound. The coated frit is then fired in the conventional manner and the yellow color shift in the resulting porcelain enamel coating is materially reduced.

One technique for depositing a ceramic coating composition on the substrate is to apply a first layer of ground coat or slush coat of a slip containing the frit. A ground coat is a porcelain enamel applied directly to the metal substrate to function as an intermediate layer between the metal and the cover coat. After the coating is deposited on the substrate, it is ordinarily dried prior to firing. Drying of the slip deposit is usually conducted at atmospheric pressure and at a temperature of about 350°F. The step of drying is done for efficiency before the coating is vitrified at a temperature in the range of 1,400° to 1,700°F.

The chemical mechanism of the present invention is not presently understood, although it is suspected that crystallization of the rutile polymorph is initiated at the surface of the individual frit particles during firing of the coating, and rutile crystallization is suppressed by the presence of the layer of hydrous titania on the frit particles. Under these conditions, the anatase polymorph bulk crystallizes within the frit particle during firing to form the highly desirable anatase which results in the improved color stability. Apparently, the hydrous titania layer exerts a synergistic chemical and physical effect on the titania opacification of the frit during fusion upon firing. Whatever the mechanism, a commercially significant reduction in the characteristic blue-to-yellow color shift in titania-opacified ceramic coatings is achieved by providing a hydrous titania on the surface of the frit particles prior to fusing such particles as a porcelain enamel.

The composition of frits suitable for practicing the present invention is not critical as long as the frits contain an opacifying proportion of $TiO_2$, although some compositions respond better than others. By opacifying proportion is meant a proportion sufficient for development of an opacifying titania polymorph upon firing. Such $TiO_2$-opacified enamel frits are well known and typical compositions are disclosed in U.S. Pat. Nos. 3,114,646; 3,409,458; 3,216,847; 3,278,284 and 2,837,443 and British Pat. No. 966,451, the disclosures of which are incorporated by reference. The frits can be heat treated to prenucleate the titania as in U.S. Pat. No. 3,409,458 if desired. Usually, the $TiO_2$ content of the frits is in the range of about 10 to 30 percent by weight of the frits compositions. Other components of the frits compositions are $SiO_2$, $Al_2O_3$, $B_2O_3$, $PbO$, $ZnO$, $ZrO_2$, $P_2O_5$, $Na_2O$, $K_2O$, $Li_2O$, $MgO$, $CaO$, $BaO$ and other conventional ingredients, such as halide fluxes. Typical titania-opacified porcelain enameling frits suitable for use in the present invention are within the following composition ranges:

| Oxide | Percent by Weight |
| --- | --- |
| $SiO_2$ | 35 to 55 |
| $TiO_2$ | 15 to 25 |
| $B_2O_3$ | 10 to 20 |
| $Al_2O_3$ | 0 to 2 |
| $Na_2O$ | 0 to 10 |
| $K_2O$ | 0 to 10 |
| $Li_2O$ | 0 to 5 |
| $MgO$ | 0 to 2 |
| $CaO$ | 0 to 5 |
| $P_2O_5$ | 0 to 4 |
| F | 0 to 5 |
| $ZnO$ | 0 to 5 |
| $ZrO_2$ | 0 to 10 |

The particle size of the frit is not particularly critical, although it should be appreciated that frits of smaller particle size are generally less color stable than coarser frits of the same composition. The optimum frit particle size for wet process enameling is dictated by the rheology and application requirements. For hand spray application, the particle size is 1 to 2 percent retained on 200-mesh Tyler Sieve. For electrostatic application, optimum fineness is 1 to 2 percent retained on 325 mesh. A so-called "common grind" that can be used for either hand spray or electrostatic application is 6 to 8 percent retained on a 325-mesh Tyler Sieve.

The grinding of frit can be done in a ball mill; and the hydrous titania, such as a colloid sol or dispersible flow of titania or a material hydrolyzable to titania can then be mixed together with the ground frit in a low shear blunger or agitation tank. Another method of depositing a coating by the dry technique is to mix the coating composition; add the hydrous titania or material hydrolyzable thereto to form an intimate powder admixture and then distribute the admixture over the substrate to be coated.

The term "porcelain enameling composition" as used herein means the titania-containing porcelain enameling frit conventionally produced by quenching and breaking up molten, glassy materials and it also includes, if needed, the usual conventional mill additives for its deposition on the surface of a prepared enameling metal or on such metal or ceramic substrate already coated with a previous coating such as a ground coat or slush coat.

A slip is one type of ceramic coating composition and refers to dispersion, slurry, paste or spreadable or sprayable mixture of frit suspended in a volatile liquid vehicle. A dry process ceramic coating composition is one that is sprinkled as particulates directly on a hot surface as in U.S. Pat. No. 3,409,458.

When preparing the slip, the usual mill additives such as clays, stains, binders, surfactants, thickeners, gums, suspending and peptizing agents, resinous and other organic additives and the like can be used to attain desired suspension stability and consistency for application and improved adherence for deposition onto the substrate.

The preferred method of coating the substrate is to deposit an aqueous slip comprising volatile liquid vehicle, such as water, non-volatile materials or solids content including the frit and the hydrous titania or material hydrolyzable thereto in addition to fugitive binder agents, thickeners, and other mill additives. This method is preferred because it provides for intimate contact and efficient coating of the frit with the hydrous titania or material hydrolyzable thereto.

In one method of coating the frit, a titanium compound which is hydrolyzable to yield the titania is applied to the substrate to be coated (without hydrolysis to $TiO_2$). The frit is then applied to the coated substrate and the hydrolyzable titanium compound is then hydrolyzed in situ on the frit particles. The hydrous titania coating required is relatively small in proportion to the weight of frit and is usually in the range of about 0.001 part to 5.0 part, and preferably about 0.01 to 1 parts of titania per 100 parts of frit. Commerically available hydrolyzable titanium compounds include esters of titanic acid, such as the titanium lactates, citrates, tartrates and alkanol amine titanates and esters generally corresponding to the formula $Ti(OR)_4$ wherein R is an alkyl radical containing 1 to 8 carbon atoms. Such compounds are sold by E. I. duPont de Nemours & Company, Inc., under the trade name of "Tyzor" organic titanates. Examples of these compounds include tetra-isopropyl titanate, tetrabutyl titanate, tetrakis (2-ethylhexyl) titanate, tetrastearyl titanate, titanium acetylacetonate, titanium lactate (as the ammonium salt), and triethanolamine titanate. Other suitable titanium esters are shown in U.S. Pat. No. 2,768,907, the disclosure of which is incorporated by reference. These titanium esters are adapted to react with moisture to provide a hydrolyzed $TiO_2$ film on the frit particle.

The titanates, such as isopropyl titanate, that are rapidly decomposed by water are not usually preferred because hydrolysis often occurs before contact with the frit. This causes the hydrolyzation products to deposit non-uniformly on the frit. For this reason, slowly hydrolyzable titanium chelate materials, such as titanium acetyl acetonate, the ammonium salt of titanium lactate, and triethanol amine titanate, are preferred because these materials hydrolyze slowly directly on the frit particles in the presence of moisture. This controlled hydrolysis yields a very effective, hydrous titania coating for preventing the formation of rutile.

In the most preferred practice, a coating of hydrous titania on the surface of the individual frit particles for porcelain enameling applications can be accomplished by adding aqueous solutions of appropriate organic titanates of the duPont Tyzor type to the procelain enamel slip either in the mill charge or by blunging after milling. It has been discovered that it is usually desirable to add the organotitanates in the mill charge since by this procedure the rheology of the slip suspension is least affected. When titanic acid esters, such as titanium, lactate are added to the porcelain enamel during milling of the slip, good color stabilization has been achieved when the ester is used in the equivalent proportion of 0.03 part of $TiO_2$ per 100 parts frit with the equivalent of 0.001 to 0.1 part of $TiO_2$ per 100 parts of frit being useful ranges. Higher concentrations although useful in providing color stability may have detrimental effects on the slip rheology, and result in surface defects in the fired coating due to difficulty in "burning out" an organic component during firing.

Another means for coating the frit particles with a hydrous titania is to coat or treat the frit with a hydrous titania or material hydrolyzable thereto immediately after the molten glass is quenched to frit by slurrying or heating the preground frit with hydrous titania and then drying before bagging the frit.

It is noted that U.S. Pat. No. 2,768,907 discloses a method for bonding a vitreous enamel coating to the surface of a metal by priming the surface with a hydrolyzed titanate ester, then applying the enameling composition thereover and then firing the composition to yield a porcelain enamel surface. This method does not achieve color stability because the $TiO_2$ film is formed on the substrate prior to application of the frit, so the frit is not provided with a hydrous titania layer.

The following examples show ways in which the invention can be practiced. All temperatures are in °F.; all percentages are weight percentages; and all parts by weight unless otherwise indicated.

The materials used in the following Examples are identified below for convenience in references:

| Material Designation | Chemical Description | Supplier |
| --- | --- | --- |
| Clay A | High Set Ball Clay | |
| Clay B | Medium High Set Ball Clay | |
| Tyzor LA | Titanium Lactate, Ammonium Salt (50% by weight—containing 8.2% Ti) | duPont |
| Tyzor AP | Mixture of Isopropyl and Stearyl Titanate (containing 14.5% Ti) | duPont |
| Tyzor PB | Polymerized Tetrabutyl Titanate (containing 16.8% Ti) | duPont |
| Tyzor TST | Tetrastearyl Titanate (containing 4.2% Ti) | duPont |
| Tyzor WR | Titanium Chelate Stabilized with Nitro-genous Polymer (containing 7.4% Ti) | duPont |
| Tyzor TOT | Tetrakis (2-Ethylhexyl) Titanate (containing 8.5% Ti) | duPont |
| Tyzor AA | Titanium Acetylacetonate 75% solution in Iso-propanol—product contains 9.9% Ti | duPont |
| Tyzor TPT | Tetraisopropyl Titanate (containing 16.8% Ti) | duPont |
| Tyzor TE | Triethanolamine Titanate—(80% by weight in Isopropanol—product containing 8.3% Ti) | duPont |
| Blue Oxide Stain | Cobalt-Chrome-Aluminate Ceramic Colorant | |
| $TiO_2$, Hydrated | Hydrated Colloidal floc or sol Titanium Dioxide (containing the equivalent of 10.3% $TiO_2$) | |
| Syloid 255 | Colloidal silica (suspending agent) | W. R. Grace |
| Setit A | Alumina Hydrate (thickening agent) | TAM Division National Lead Co. |

BLUE OR WHITE MILL FORMULA

| | | |
| --- | --- | --- |
| Frit | 1000 | parts |
| Clay A | 10 | do. |
| Clay B | 25 | do. |
| Bentonite | 1.9 | do. |
| $NaNO_2$ | 1.25 | do. |
| $MgCO_3$ | 0.3 | do. |
| $K_2CO_3$ | 1.55 | do. |
| $TiO_2$ (pigment grade anatase used for increasing reflectance) | 5 | do. |
| Setit A | 0.625 | do. |
| Blue Oxide Stain (present only in Blue Formulas) | 10 | do. |
| Water | 450 | do. |

Ball mill about 1¾ hours to a fineness of 1 to 2 percent retained on 200 mesh.

TYPICAL APPLICATION AND FIRING TECHNIQUE

Apply enamel at a rate of about 25 grams/ft.$^2$ (dry) on 20-gage, extra low-carbon steel picked for direct-on application. Fire 2 ½ to 3 minutes on points in a box furnace. For "cold point" fire, place sample panel on ¼ inch thick cast iron backup plate and fire 10 minutes on points.

FRIT COMPOSITIONS USED IN THE EXAMPLES
(% by weight)

| | A | B | C | D | E | F | G | H | I | J | K | L | M |
| --- | --- | --- | --- | --- | --- | --- | --- | --- | --- | --- | --- | --- | --- |
| $Na_2O$ | 9.6 | 6.8 | 7.9 | 7.9 | 7.2 | 8.4 | 8.5 | 6.9 | 7.4 | 2.8 | 3.6 | 7.5 | 9.0 |
| F | 4.0 | 3.9 | 3.8 | 2.8 | 1.3 | 3.9 | 3.6 | 1.6 | 9.1 | 1.3 | — | 4.4 | 4.8 |
| $B_2O_3$ | 16.2 | 14.7 | 15.3 | 15.6 | 12.4 | 16.3 | 15.5 | 13.5 | 13.5 | 6.1 | 5.4 | 15.2 | 15.7 |
| $SiO_2$ | 38.0 | 41.4 | 39.1 | 37.6 | 45.9 | 45.7 | 38.6 | 42.9 | 38.6 | 43.9 | 27.7 | 38.8 | 40.7 |
| ZnO | 0.5 | 1.2 | — | 1.0 | — | 1.0 | 0.5 | 1.0 | — | — | — | — | — |
| $K_2O$ | 7.2 | 9.7 | 8.0 | 7.9 | 9.0 | 7.0 | 7.6 | 8.2 | 4.1 | — | 8.4 | 5.7 | — |
| $ZrO_2$ | 2.1 | — | — | — | — | 1.2 | 0.5 | 4.1 | 2.5 | — | — | — | — |
| $P_2O_5$ | 2.6 | 1.3 | 3.2 | 3.9 | 2.0 | 2.0 | 3.2 | 3.3 | 2.0 | — | — | 2.6 | 1.6 |
| $TiO_2$ | 19.0 | 20.5 | 21.5 | 19.3 | 19.8 | 11.1 | 20.6 | 16.5 | 17.6 | 9.0 | 7.0 | 21.9 | 21.2 |
| $As_2O_3$ | 0.6 | — | — | 0.1 | — | — | — | — | — | — | — | — | — |
| $Li_2O$ | — | 0.3 | 0.7 | 1.3 | — | 1.1 | 1.3 | 0.6 | 0.9 | — | — | 1.0 | 1.0 |
| $Al_2O_3$ | — | — | 0.1 | 1.7 | 1.8 | 0.1 | 0.6 | 1.2 | 0.3 | — | — | — | — |
| MgO | — | — | 0.2 | — | 1.5 | — | — | — | — | — | — | — | — |
| CaO | — | — | — | — | 0.1 | — | — | — | — | 3.3 | — | — | — |
| $MnO_2$ | — | — | — | — | — | — | — | 0.6 | — | — | — | 0.1 | 0.1 |
| PbO | — | — | — | — | — | — | — | — | — | 30.8 | 52.6 | — | — |
| CdO | — | — | — | — | — | — | — | — | — | — | 3.6 | — | — |

EXAMPLE 1

Frit A is ground in the above-described Blue Mill Formula to a fineness of 1 to 2 percent retained on 200 mesh to form an enameling slip. This slip serves as a control slip.

A second mill formula illustrative of the invention is prepared in the same manner as the control slip, except that 5 parts by weight of Tyzor LA are included in the formula. This is equivalent to 0.67 parts of $TiO_2$ per 1,000 parts of frit.

Each slip is then applied to several 4-inch × 6-inch, 20-gage steel panels by spray application at a weight of 25 grams/ft.$^2$ (dry). The sprayed panels are dried in a conventional dryer at about 300°F. One set of panels treated with the control slip and one set of panels treated with inventive slip are fired at 1,380°F. for about 3 minutes; another set of panels treated with the control slip and another set of panels treated with inventive slip are fired at 1,460°F. for 3 minutes; and similar sets of control and inventive panels are fired at 1,540°F. for 3 minutes. The sample panels are cooled to room temperature and color values are determined on a Gardner Color Difference Meter. In these measurements the -b values indicate blue; so "blueness" increases with more negative b readings. Yellow is the compliment of blue; so "yellowness" increases as the b values become less negative or more positive. The panels are generally "robins egg blue" in color with the less negative b values indicating a greenish-blue color.

GARDNER COLOR DIFFERENCE METER "b" VALUES

|  | Firing Temperature | | |
| --- | --- | --- | --- |
|  | 1380°F. | 1460°F. | 1540°F. |
| Control Panels | −19.1 | −16.3 | −5.7 |
| Inventive Panels | −17.2 | −17.3 | −11.8 |

This data indicates that the control panels become yellower upon firing at higher temperature in that there is a yellow color shift of 13.4 units in firing at 1,540°F. as compared to firing at 1,380°F. The inventive panels experience a color change of only 5.4 units at similar firing temperatures. Similar results are obtained using equivalent amounts on a titanium basis of titanium tartrate or titanium citrate in place of the Tyzor LA.

EXAMPLE 2

The procedures of Example 1 are repeated, except that only 0.5 parts by weight of the Tyzor LA are employed in the inventive slip. This is equivalent to 0.067 parts $TiO_2$ per 1,000 parts of frit. The Gardner Color Difference Meter values are set forth below at various firing temperatures:

|  | Firing Temperature | | |
| --- | --- | --- | --- |
|  | 1380°F. | 1460°F. | 1540°F. |
| Control Panels | −19.5 | −16.8 | −4.2 |
| Inventive Panels | −20.0 | −17.6 | −7.9 |

This example indicates that even very low concentrations of hydrolyzable titanium compounds are effective in reducing the yellow color shift.

EXAMPLE 3

The procedures of Example 1 are repeated, except that the Tyzor LA is used in the proportions set forth below. The Gardner Color Difference Meter values at various firing temperatures are set forth below:

|  | Firing Temperature | | |
| --- | --- | --- | --- |
|  | 1380°F. | 1460°F. | 1540°F. |
| Control Panels | −19.3 | −16.8 | −5.4 |
| Inventive Panels with 1 Part Tyzor A | −19.7 | −18.1 | −10.8 |
| Inventive Panels with 2 Parts Tyzor LA | −20.0 | −18.4 | −10.7 |
| Inventive Panels with 3 Parts Tyzor LA | −20.0 | −18.4 | −11.8 |
| Inventive Panels with 5 Parts Tyzor LA | −20.0 | −18.0 | −9.2 |

The Example shows the effectiveness of the present invention in reducing the yellow color shift. This is particularly evident at the 1,540°F. firing temperature.

EXAMPLE 4

The procedures of Example 1 are repeated using Frit B in the White Mill Formula. The formulation produces a titania-opacified white enamel as is used in bathtubs. Three parts of Tyzor LA are included in the inventive formulation and the panels are prepared as in Example 1. The Gardner Color Difference Meter valves are set forth below:

|  | Firing Temperature | |
| --- | --- | --- |
|  | 1380°F. | 1520°F. |
| Control Panels | −3.2 | −2.0 |
| Inventive Panels | −4.0 | −3.8 |

This example shows that the present invention is effective in reducing the yellow color shift in titania-opacified white enamels.

EXAMPLE 5

The procedures of Example 1 are repeated using 3 parts of the various tyzor titanium compounds listed below in the Blue Mill Formula. The Gardner Color Difference Meter values are set forth below.

| Additive | 1380°F. | 1540°F. |
| --- | --- | --- |
| Control | −19.4 | −4.2 |
| Tyzor AP | −18.7 | −3.7 |
| Tyzor PB | −19.0 | −4.1 |
| Tyzor TST | −18.8 | −4.1 |
| Tyzor WR | −19.0 | −4.9 |
| Tyzor TOT | −19.2 | −5.1 |
| Tyzor AA | −18.8 | −5.5 |
| Tyzor TE | −17.1 | −4.8 |
| Tyzor LA | −19.6 | −10.8 |

The Tyzor compounds are listed above according to their approximate rate of hydrolysis so that those compounds near the bottom of the list hydrolyze more slowly than those near the top of the list. The data show that the more slowly hydrolyzed titanium compounds are generally more effective in reducing the yellow color shift.

The above data indicate that the rate of hydrolysis of the titanium compound could be a factor in preventing the yellow color shift, and the more slowly hydrolyzed compounds are more effective. This conclusion is subject to the fact that the concentrations of $TiO_2$ are not equivalent in all compositions.

EXAMPLE 6

Various titania-opacified frits are milled in White and Blue Mill Formulas by the procedures of Example 1 with and without the addition of 3 parts Tyzor LA. Sample panels are prepared as in Example 1 and the anatase/rutile ratio in the enamel coating is determined by X-Ray diffraction data.

Anatase/Rutile Ratio

| Frit Used in White Mill Formula | With 3 Parts of Tyzor LA | Without LA |
|---|---|---|
| B | 3.56 | 2.94 |
| C | 3.05 | 2.82 |
| A | 3.13 | 2.76 |
| D | 3.09 | 3.96 |
| E | 3.99 | 3.34 |
| F | 2.34 | 1.74 |
| G | 3.37 | 2.65 |
| H | 3.95 | 3.38 |
| Frit Used in Blue Mill Formula | | |
| A | 3.21 | 1.67 |
| L | 2.80 | 2.42 |
| M | 4.29 | 3.27 |

The data show that the presence of the titanium compound promotes the formation of anatase at the expense of rutile as demonstrated by the increased anatase/rutile ratio.

EXAMPLE 7

White and Blue Mill Formulas are prepared using the frits described below. In some of the Formulas, 4 parts of Hydrous $TiO_2$ Sol (equivalent 0.41 part $TiO_2$) are added and in other Formulas, 3 parts of Tyzor LA (equivalent of 0.41 part $TiO_2$) are added. Panels are prepared, fired and evaluated as in Example 1. The Gardner Color Difference Meter values are set forth below:

Frit B Used in White Mill Formula

| | 1380°F. | 1540°F. |
|---|---|---|
| Control | −3.2 | −1.0 |
| With 4 parts of Hydrous $TiO_2$ Sol | −3.6 | −2.8 |
| With 3 parts of Tyzor LA | −4.0 | −3.3 |

Frit H Used in White Mill Formula

| | 1380°F. | 1540°F. |
|---|---|---|
| Control | −3.8 | −1.5 |
| With 4 parts of Hydrous $TiO_2$ Sol | −4.0 | −1.4 |
| With 3 parts of Tyzor LA | −3.8 | −2.0 |

Frit A Used in White Mill Formula

| | 1380°F. | 1540°F. |
|---|---|---|
| Control | −3.6 | −1.4 |
| With 4 parts of Hydrous $TiO_2$ Sol | −4.1 | −2.6 |
| With 3 parts of Tyzor LA | −3.9 | −3.0 |

Frit A Used in Blue Mill Formula

| | | |
|---|---|---|
| Control | −18.4 | −3.5 |
| With 4 parts of Hydrous $TiO_2$ Sol | −19.7 | −8.7 |
| With 3 parts of Tyzor LA | −19.8 | −10.4 |

The above data indicate that Hydrous $TiO_2$ Sol and Tyzor LA are both effective in reducing the yellow color shift in Blue and White titania-opacified porcelain enamels.

EXAMPLE 8

This example illustrates the application of the present invention to dry process enameling.

Several dry process white enameling compositions are prepared by dry blending 600 grams of Frit I in a ball mill for 1½ hours with each of the below additions:

Run (1) — 3 ml. Tyzor LA in 7 ml. water (the equivalent of 0.5 grams of $TiO_2$)
Run (2) — 0.9 g. Tyzor PB in 9 ml. $CCl_4$ (the equivalent of 0.25 grams of $TiO_2$)
Run (3) — 0.9 ml. Tyzor TPT in 9 ml. $CCl_4$ (the equivalent of 0.25 grams of $TiO_2$)
Run (4) — 3 ml. Hydrous $TiO_2$ Sol (containing only 6.5% $TiO_2$) in 2 ml. water (the equivalent of 0.2 grams of $TiO_2$)
Control — 5 ml. Water In the above compositions, the $CCl_4$ helps to prevent rapid hydrolysis of the Tyzor Pb and Tyzor TPT.

The dry process enameling compositions are then sprinkled onto the surface of a ¼-inch cast iron plate that had previously been conventionally slush coated with a refractory porous ground coat and preheated to 1,600°F. The application rate of the dry process enameling composition is 25 grams/ft.² The plate after coating is fired for 1 ½ minutes at 1,600°F. The b values of the samples are determined by Gardner Color Difference Meter and are set forth below.

| Run No. | "b" |
|---|---|
| 1 | −4.8 |
| 2 | −0.8 |
| 3 | −3.4 |
| 4 | −3.7 |
| Control | +1.0 |

This data indicates that the yellow-color shift is reduced in dry process enameling according to the present invention.

EXAMPLE 9

The procedures of Example 8 are repeated except that appropriate amounts of $TiOCl_2$ and $TiOSO_4·2H_2O$ are dry blended in separate enameling compositions, so as to yield 0.2 grams of "$TiO_2$". When applied to ¼-inch cast iron using the dry process method of Example 8, the following results are obtained:

| | $TiOSO_4·2H_2O$ | $TiOCl_2$ | Control |
|---|---|---|---|
| "b" | −3.1 | −1.9 | +3.0 |

This data indicates a material reduction in the yellow color shift when using $TiOSO_4·2H_2O$ or $TiOCl_2$ as the source of titanium.

EXAMPLE 10

PART I

An aqueous solution of titanium lactate (2 percent Tyzor LA in water) is sprayed onto the surface of three sets (sets A, B, and C) of 4-inch by 6-inch enameling iron panels so that the panels have thin, wet uniform coatings thereon. After drying the panels at room temperature, a second application is made in the same manner and the panels are then dried at 200°F. After the above treatment: Panel set A received no further processing and no hydrolysis of the titanium lactate takes place at this stage. Panel set B is heated in an oven for 10 minutes at 525°F. to hydrolyze the titanium lactate and form a deposit of $TiO_2$. Panel set C is heated for 8 minutes at 800°F. to pyrolyze the titanium lactate and form a deposit of $TiO_2$ on the surface of the panels. A fourth set of panels (set D) serves as a control and is not treated with titanium lactate.

Frit A is used in the Blue Mill Formula and ground as in Example 1. The resulting slip is sprayed on the four sets of panels as in Example 1 and they are air dried for 15 minutes and then dried at 250°F. for 10 minutes to remove any remaining water. They were then fired for 3 minutes at 1,540°F.

| GARDNER COLOR DIFFERENCE METER "b" VALUES | |
|---|---|
| Panel set A | −12.6 |
| Panel set B | −2.4 |
| Panel set C | −3.0 |
| Control set | −2.4 |

This example shows that when a deposit of hydrolyzed titanium oxide is formed on the substrate prior to application of the frit (as in U.S. Pat. No. 2,768,907), there is no color stabilizing effect in contrast to panel set A representing the present invention.

PART II

Using a technique similar to Example 2 in U.S. Pat. No. 2,768,907, solutions of easily hydrolyzable organic titanates are sprayed onto the surface of the enameling iron panels. Organic titanates evaluated are: tetrabutyl titanate; 2-ethylhexyl titanate applied as 2 percent solutions in benzene.

After air drying, some of the panels are placed over a pan of boiling water for three minutes to assure hydrolysis of the titanate to $TiO_2$. The panels are then maintained for 15 minutes at 400°F. as in U.S. Pat. No. 2,768,907.

The above-described panels together with several untreated control panels are then sprayed with the Blue Mill Formula and fired as in Part I of this example. All of the fired panels have Gardner Color Difference Meter b values between 0 and −1 which indicate a lack of color stability.

Having thus described the invention, what is claimed is:

1. A porcelain enameling composition comprising coated ceramic frit particles which contain at least about 10 weight percent crystallizable $TiO_2$ and which have a surface layer containing per 100 weight parts of said frit particles an amount equivalent to at least about 0.001 weight parts of hydrous titania of a titanium compound which will form hydrous titania when heated to a temperature lower than the fusion temperature of said frit particles.

2. The composition of claim 1 wherein said surface layer contains an ester of titanic acid or the ammonium salt of such ester.

3. The composition of claim 2 wherein said ester is selected from the group consisting of esters represented by the formula $TI(OR)_n(OH)_{4-n}$ where $2 \leq n \leq 4$ and where R stands for
   a. an alkyl radical having from 1 to 8 carbon atoms; or
   b. an aliphatic acyl radical having from 1 to 18 carbon atoms; or
   c. an aliphatic radical having an amino nitrogen or a carbonyl oxygen or a carboxyl oxygen or an alcohol oxygen in either a $\beta$ or $\gamma$ position relative to the atom which is the normal bonding site of said aliphatic radical.

4. The composition of claim 2 wherein said ester is selected from the group consisting of titanium lactate, titanium citrate, and titanium tartrate.

* * * * *

UNITED STATES PATENT OFFICE
CERTIFICATE OF CORRECTION

PATENT NO. : 3,867,157

DATED : Feb. 18, 1975

INVENTOR(S) : John E. Peeling, Jr.

It is certified that error appears in the above-identified patent and that said Letters Patent are hereby corrected as shown below:

Column 5, line 61, should read:

|        | A   | B   | C   | D   | E   | F   | G   | H   | I   | J   |
|--------|-----|-----|-----|-----|-----|-----|-----|-----|-----|-----|
| $K_2O$ | 7.2 | 9.7 | 8.0 | 8.7 | 7.9 | 9.0 | 7.0 | 7.6 | 8.2 | 4.1 |

|   | K   | L   | M   |
|---|-----|-----|-----|
|   | --- | 8.4 | 5.7. -- |

Column 8, line 13, "1 Part Tyzor A" should read:
--1 Part Tyzor LA --.

Column 12, lines 35 and 36, "alco-hol" should read:
-- alcoho-lic --.

Signed and sealed this 17th day of June 1975.

(SEAL)
Attest:

RUTH C. MASON
Attesting Officer

C. MARSHALL DANN
Commissioner of Patents
and Trademarks